(12) United States Patent
Costin

(10) Patent No.: US 7,489,046 B2
(45) Date of Patent: Feb. 10, 2009

(54) WATER TURBINE SYSTEM AND METHOD OF OPERATION

(75) Inventor: Daniel P. Costin, Montpelier, VT (US)

(73) Assignee: Northern Power Systems, Inc., Barre, VT (US)

( * ) Notice: Subject to any disclaimer, the term of this patent is extended or adjusted under 35 U.S.C. 154(b) by 49 days.

(21) Appl. No.: 11/422,966

(22) Filed: Jun. 8, 2006

(65) Prior Publication Data

US 2007/0284882 A1    Dec. 13, 2007

(51) Int. Cl.
*H02P 9/00* (2006.01)
*F03D 9/00* (2006.01)

(52) U.S. Cl. .......................................... 290/43; 290/54

(58) Field of Classification Search ................... 290/42, 290/43, 44, 52, 53, 54, 55; 415/7
See application file for complete search history.

(56) References Cited

U.S. PATENT DOCUMENTS

| | | | | |
|---|---|---|---|---|
| 2,501,696 A * | 3/1950 | Souczek | ........................ | 290/43 |
| 4,205,943 A * | 6/1980 | Vauthier | ........................ | 416/86 |
| 4,219,303 A * | 8/1980 | Mouton et al. | .................. | 415/7 |
| 4,313,059 A * | 1/1982 | Howard | ........................ | 290/54 |
| 4,864,152 A | 9/1989 | Pedersen | | |
| 5,592,816 A | 1/1997 | Williams | | |
| 5,946,909 A | 9/1999 | Szpur | | |
| 6,091,161 A * | 7/2000 | Dehlsen et al. | ................ | 290/43 |
| 6,531,788 B2 * | 3/2003 | Robson | ........................ | 290/43 |
| 6,652,221 B1 | 11/2003 | Praenkel | | |
| 6,806,586 B2 | 10/2004 | Wobben | | |
| 6,833,631 B2 * | 12/2004 | Van Breems | .................. | 290/42 |
| 6,856,036 B2 | 2/2005 | Belinsky | | |
| 7,075,189 B2 * | 7/2006 | Heronemus et al. | ........... | 290/44 |
| 7,077,072 B2 * | 7/2006 | Wingett et al. | .............. | 114/312 |
| 7,129,596 B2 * | 10/2006 | Macedo | ........................ | 290/55 |
| 7,291,936 B1 * | 11/2007 | Robson | ........................ | 290/43 |
| 7,298,056 B2 * | 11/2007 | Gizara | ........................ | 290/54 |
| 7,352,074 B1 * | 4/2008 | Pas | ............................. | 290/43 |

FOREIGN PATENT DOCUMENTS

GB        2348249 A      9/2000

OTHER PUBLICATIONS

William A. Venezia, Turbine Under Gulf Stream: Potential Energy Source, Sea Technology, Sep. 1995, pp. 10-14, vol. 36, No. 9., Compass Publications, Inc., Arlington, VA.

* cited by examiner

*Primary Examiner*—Nicholas Ponomarenko
(74) *Attorney, Agent, or Firm*—Downs Rachlin Martin PLLC

(57) ABSTRACT

A system for providing electrical power from a current turbine is provided. The system includes a floatation device and a mooring. A water turbine structure is provided having an upper and lower portion wherein the lower portion includes a water fillable chamber. A plurality of cables are used to couple the system where a first cable couples the water turbine to the mooring and a second cable couples the floatation device to the first cable. The system is arranged to allow the turbine structure to be deployed and retrieved for service, repair, maintenance and redeployment.

5 Claims, 9 Drawing Sheets

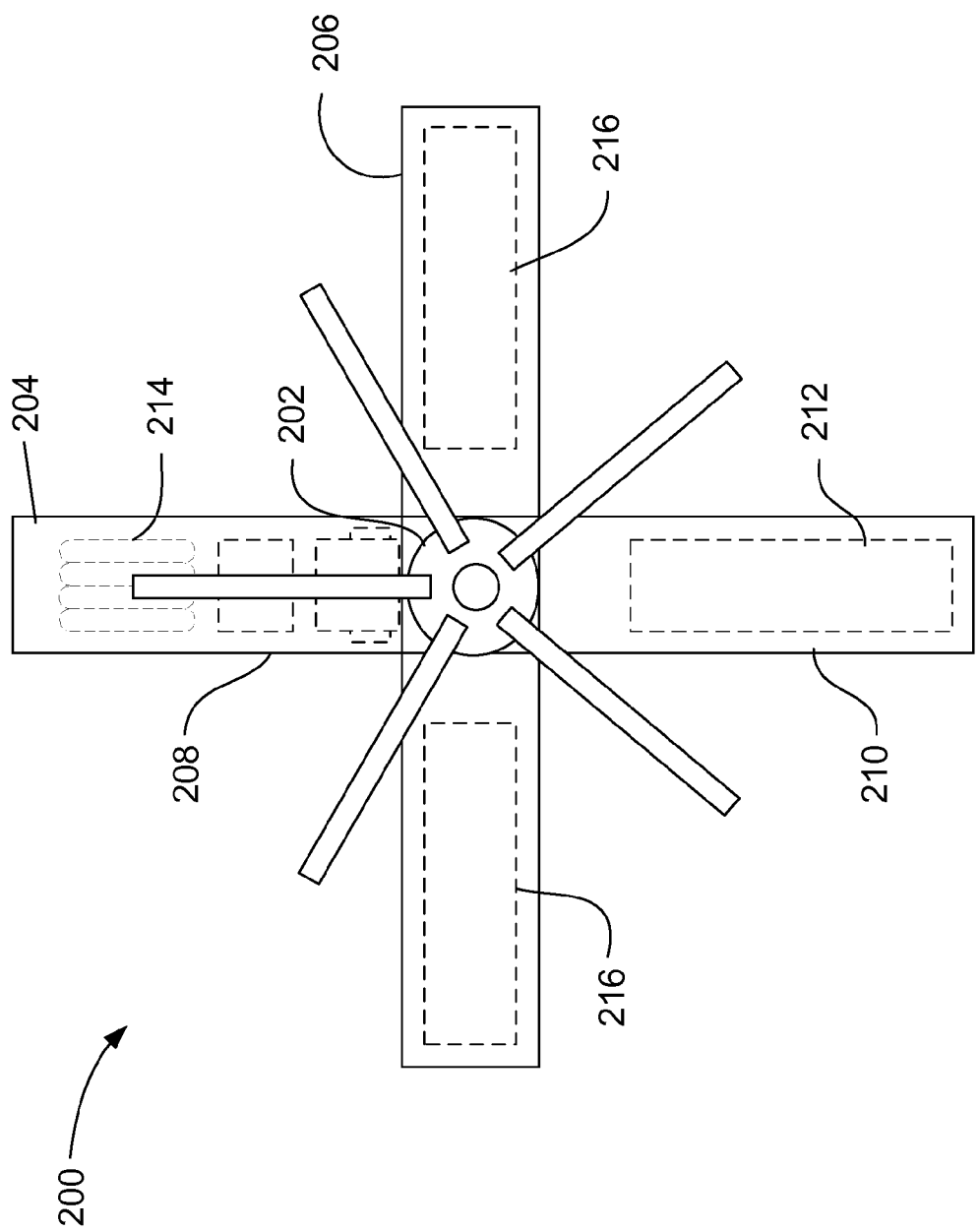

WATER TURBINE SYSTEM AND METHOD OF OPERATION

FEDERAL RESEARCH STATEMENT

This invention was made with Government support under contract DE-FG02-05ER4318 awarded by the Department of Energy. The Government has certain rights in this invention.

FIELD OF INVENTION

This disclosure relates generally to a system for generating electrical power with a water turbine system, and especially relates to a submergible water turbine system incorporating a system for easily positioning and servicing the water turbine.

BACKGROUND OF THE INVENTION

Oceans cover some 70% of the earth's surface. These bodies of water contain vast reservoir of energy mainly due to solar heating and wind stresses. If this energy couple be harnessed, a large portion of the worlds energy needs may be met in clean and renewable manner. Various devices have been developed to utilize this energy, including, ocean thermal energy conversion devices (OTEC), tidal power devices, wave power generators and flowing water (current) turbines.

OTEC devices have been proposed since the late 1800's. The OTEC devices generate electricity using the temperature difference of seawater at different depths that result from solar heating by the sun. An extreme example of this thermal differential can be seen in the arctic regions where a 40° C. temperature difference exists between the local air and the water temperature during the winter. Even in tropical and subtropical regions, as much as a 20° C. temperature differential may exist. Through a type of heat engine such as an Anderson cycle engine, the temperature differences between the surface and the ocean depths are utilized to heat and cool a working fluid. The heated working fluid is expanded through a turbine to generate electrical power. The heat is dissipated from the working fluid by the colder ocean depths and compressed before being returned to the surface to be reheated.

Another device utilizes tidal power as a means of electricity generation that is achieved by the capturing of energy contained in moving water mass due to tides. The source of the tidal energy comes from the slow deceleration of the Earth's rotation caused by the moon. Two types of tidal energy can be extracted: kinetic energy of currents between ebbing and surging tides and potential energy from the difference in height between high and low tides. The extraction of potential energy typically involves building a barrage and creating a tidal lagoon. The barrage traps a water level inside a basin. Pressure or "head" is created when the water level outside of the basin or lagoon changes relative to the water level inside. The head is used to drive turbines. This design leads to a decrease in the tidal range inside the basin or lagoon, resulting in a reduced transfer of water between the basin and the sea. This reduced transfer of water accounts for the energy produced by the scheme. The efficiency of tidal power generation in ocean dams largely depends on the amplitude of the tidal swell, which can be up to 10 meters where the periodic tidal waves funnel into rivers and fjords. Amplitudes of up to 17 meters occur in areas such as the Bay of Fundy in Canada, where tidal resonance amplifies the tidal waves.

Wave power devices produce energy, as the name suggests, through the movement of ocean surface waves. Wave size is determined by wind speed and the distance over which the wind excites the waves. Other factors affecting wave size include the depth and topography of the seafloor which can focus or disperse the energy of the waves. For a given wind speed there is a limit over which time or distance will not produce larger waves. The potential energy of a set of waves is proportional to wave height squared times the "period" or the time between wave crests. Longer period waves have relatively longer wavelengths and move faster. The wave power device typically includes some type of buoy that is connected to some type of actuator the converts the up and down motion of the waves into a form of usable power that drives the electrical generator directly or store the energy in another form (e.g. hydraulic or compressed air) for later use.

The most promising of the technologies used to tap the ocean's energy uses techniques similar to wind turbines. Flowing water or current turbines extract kinetic energy from the flow of water similar to the way wind turbines do with air. However, water currents, unlike air currents, tend to be highly predictable and consistent over time making water turbines a highly attractive source of power. Generally, the system includes a rotor capable of interacting with the flow of water such that the passing water produces a force on the rotor blades creating a rotational movement. A number of water turbines have been proposed to overcome the problems associated with deploying a submerged power system. Typically, the water turbine is transported to the desired location on a barge and supported in position using either a structure embedded in the floor or through a surface floating system that is anchored in position. The logistics involved in transporting, installing and servicing prior water turbines is substantial.

While existing water turbine power systems are suitable for their intended purposes, there still remains a need for improvements in providing a system that may be readily deployed, installed and serviced with a minimum amount of ancillary support vessels. In particular there is a need for a self contained water turbine power system that may be deployed using a simple towing vessel.

SUMMARY OF THE INVENTION

A flowing water turbine system is provided that includes a water turbine having a mooring coupled to a floatation device. A water turbine having a first body portion is coupled to the mooring and floatation device. The water turbine also has a second and third body portions mounted to the first body portion and a plurality of water fillable tanks. Each of the first, second and third body portions includes at least one water fillable tank. An electrical generator is mounted to the first body portion. A plurality of blades is coupled to the electrical generator where the plurality of blades are arranged to rotate under the influence of a water current.

A flowing water turbine system is also provided with a submerged mooring. A buoy is coupled to the mooring with a controller mounted therein. A flowing water turbine is also coupled to the mooring. The water turbine has a first body portion with a first and second end with an electrical generator mounted between the first and second end. A second body portion mounted to the first body portion between the electrical generator and the second end and a third body portion is mounted to the first body portion adjacent the second body portion. Each of the first, second and third body portions contain at least one water fillable tank. A turbine controller is mounted in the water turbine and operably coupled to the buoy controller and each of said water fillable tank.

A method for removably installing a flowing water turbine system is also provided. The method includes the steps of floating the water turbine system to a desired operating location. Coupling a buoy to the water turbine system; and transmitting a signal from the buoy to the water turbine system. A chamber is filled in response to the signal, which submerges the water turbine system to a desired depth.

An alternate embodiment method of operating a flowing water turbine system is also provided. First the water depth having a desired water current speed is determined. A first signal is transmitted from a flotation device in response to the current speed determination. The buoyancy of a water turbine system is adjusted in response to the first signal. The depth of operation of the water turbine system is changed in response to said buoyancy adjustment, and, electrical power is transmitted from said water turbine system.

The above discussed and other features will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike.

DESCRIPTION OF PREFERRED EMBODIMENT

Figure 1:
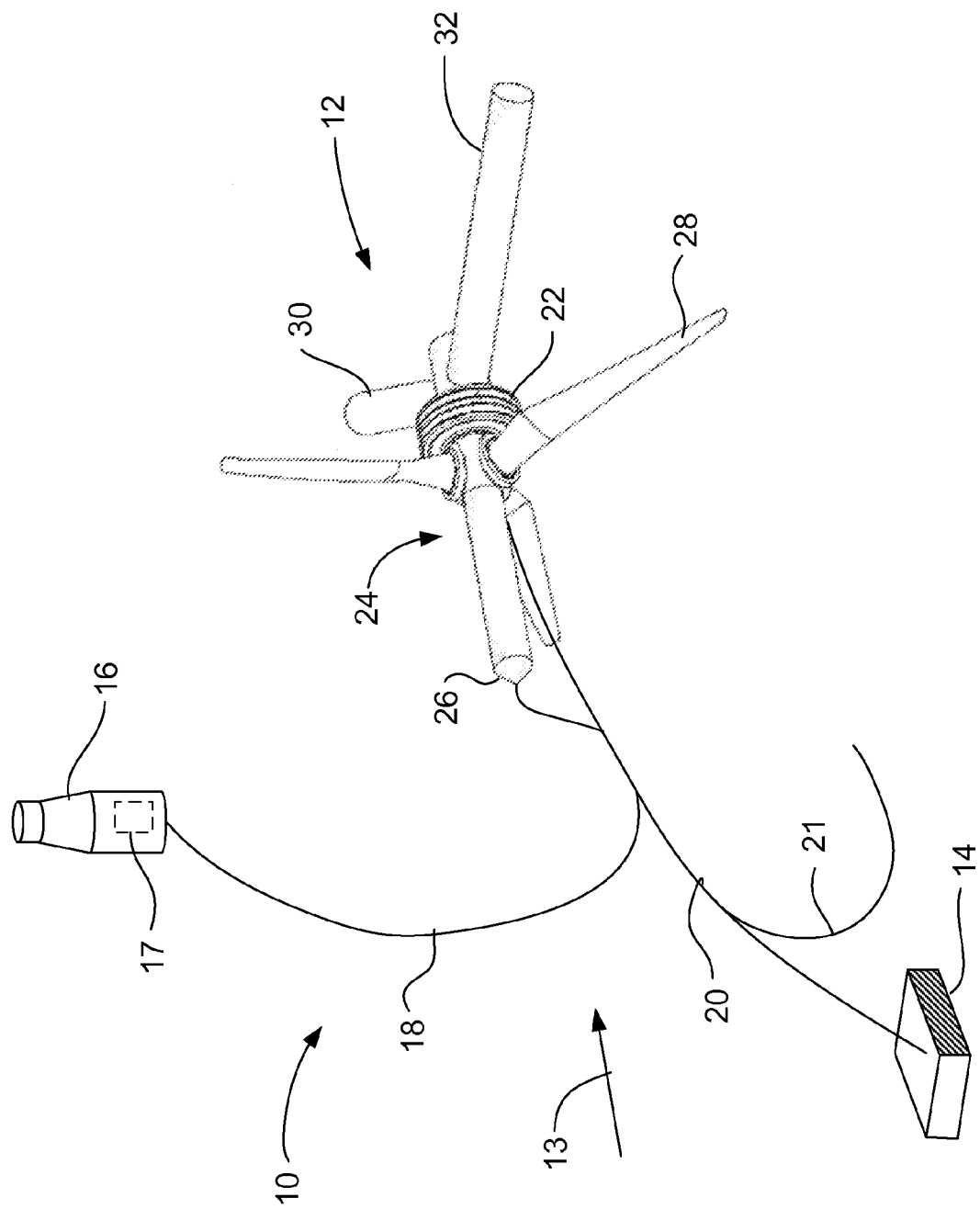
FIG. 1 is an illustration in perspective view of the preferred embodiment of the flowing water turbine power system.

Referring now to FIG. 1, the water turbine system 10 is illustrated. The turbine system 10 includes a turbine structure 12 that is coupled to a mooring 14 and a floatation device 16. Depending on the environment of the location, the mooring 14 may be installed into the seabed floor as shown, or alternatively, the mooring that is heavy enough to prevent migration of the water turbine system 10 may be used. Once the mooring 14 is installed, and the buoy 16 is connected by cables 18 and 20, the turbine structure may be deployed or retrieved with relative ease as will be described in more detail below. These major components are connected together by flexible couplings, such as cables 18, 20, 21 as will be described in a more detail herein.

The turbine structure 12 further includes a first body portion 24 having a nose cone 26, a plurality of rotatable blades 28 that are coupled to a generator 22. A first body portion 30 and second body portion 32 extend on an angle from the first body portion 24. In the preferred embodiment, the body portions 24, 30, 32 are coplanar.

Figure 2:
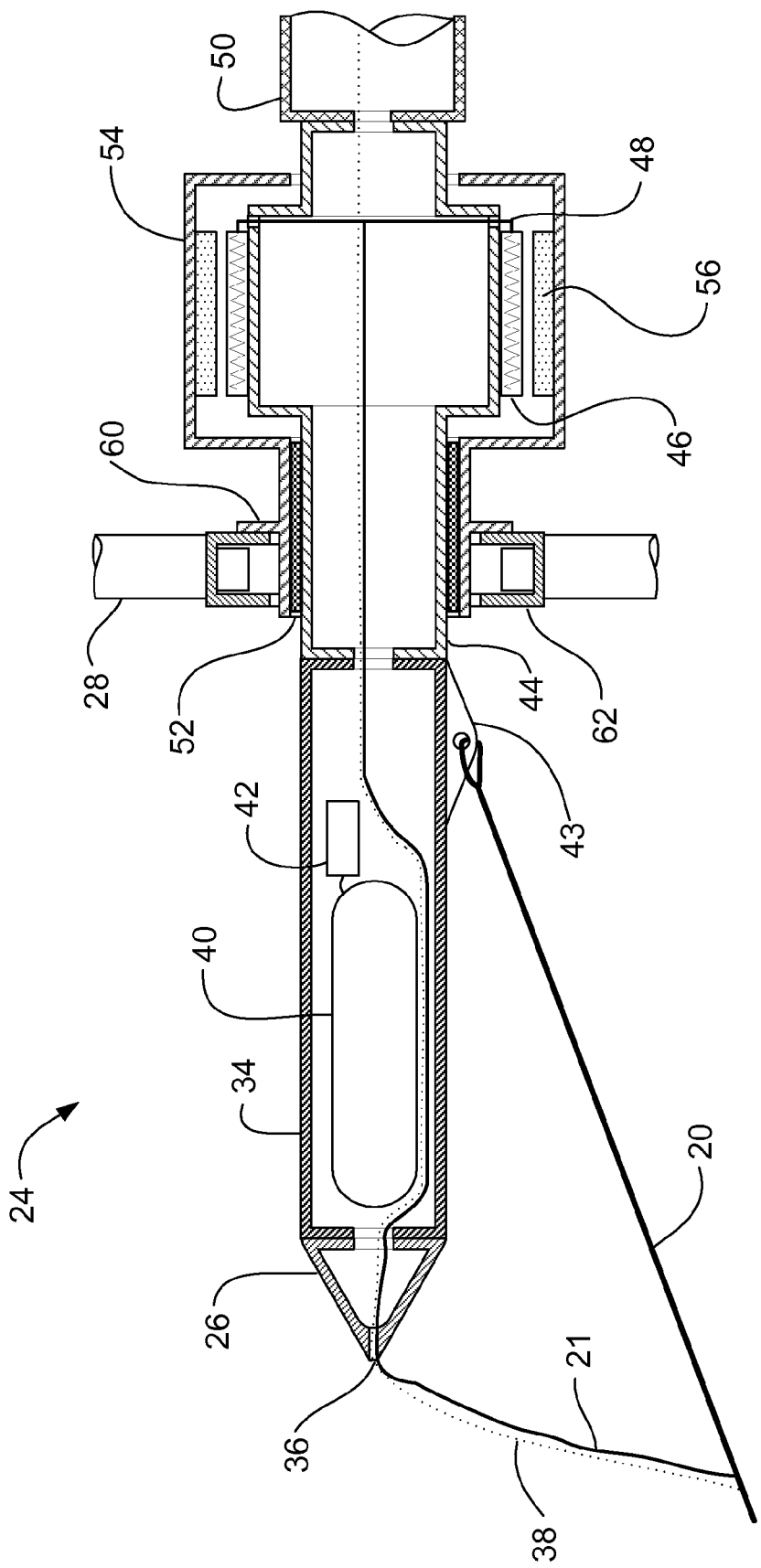
FIG. 2 is an illustration partially in section of a portion of the flowing water turbine illustrated in FIG. 1.

The flowing water turbine first body portion 24 is comprised of several components are best shown in FIG. 2. The body portion 24 includes a nosecone 26 and a nosecone body 34. It should be appreciated that while the nosecone 26 and nosecone body 34 are illustrated as separate parts, it is contemplated that they could be fabricated as a single component. A lug 43 extends from the bottom of the nosecone body 34 and provides a means for attaching the mooring cable 20 to the water turbine 12. The nosecone 26 includes a sealed feed-through 36 that allows power cable 21 and communication cable 38 to enter the body portion 24 without allowing water to enter the interior of the nosecone 26. The nosecone 26 and nosecone body 34 are generally hollow, or are similarly fabricated to allow the arrangement of components such as the water fillable tank 40 (e.g. ballast tank) and associated pump 42. A conduit (not shown) will connect the pump 42 to the outside environment to allow the filling and ejecting of water from tank 40. In addition to a conduit, other associated control hardware such as valves may be incorporated to provide adequate control of the flow of water to and from the tank 40. In the preferred embodiment, the tank 40 is a bladder tank. Alternatively, instead of a bladder tank and pump, it is contemplated that the water may be filled and ejected through the use of valves and compressed air. As used herein, the term "tank" may refer to any container or chamber capable of being filled and evacuated with water, including but not limited to flexible structures (e.g. a bladder) or structures incorporated into the body of the water turbine. The description of a discrete tank is for exemplary purposes only and not intended to be limiting in any way.

Coupled to the end of the nosecone body 34 is a stationary generator housing 44. The stationary housing 44 is generally hollow to allow passage of the power cable 21 and communications cable 38. In the preferred embodiment, the generator 22 is a permanent magnet direct drive generator. A generator winding 46 is mounted to the outer diameter of the stationary housing 44. A sealed feed-through 48 in stationary housing 44 allows the connection of the power cable 21 to the windings 46 without allowing entry of water into the interior of body portion 24. An enclosure 50 is attached to the end of stationary housing 44. Additional components (not shown) such as controllers (FIG. 3) and associated components necessary for the control and operation of the water turbine 12 are housed within the enclosure 50.

A journal bearing 52 is mounted to a magnet housing 54. The bearing 52 is arranged to support the magnet housing 54 to allow rotation about stationary housing 44. Typically, the journal bearing 52 is either press fit, or freeze fit into the inner diameter of the magnet housing 54 Permanent magnets 56 are mounted to the inner diameter of magnet housing 54 adjacent to windings 46. Typically, at least two magnets or "poles" are arranged symmetrically about the magnet housing inner diameter. Magnet housing 54 includes a flange 60 that allows the attachment of hub 62 and blades 28 to the magnet housing 54. As should be appreciated, during operation, the blades 28 are rotated under the influence of flowing water which results in the rotation of the magnets 56 around the windings 46 inducing an alternating electrical current (AC) in the windings 46 to produce electrical power.

Figure 3:
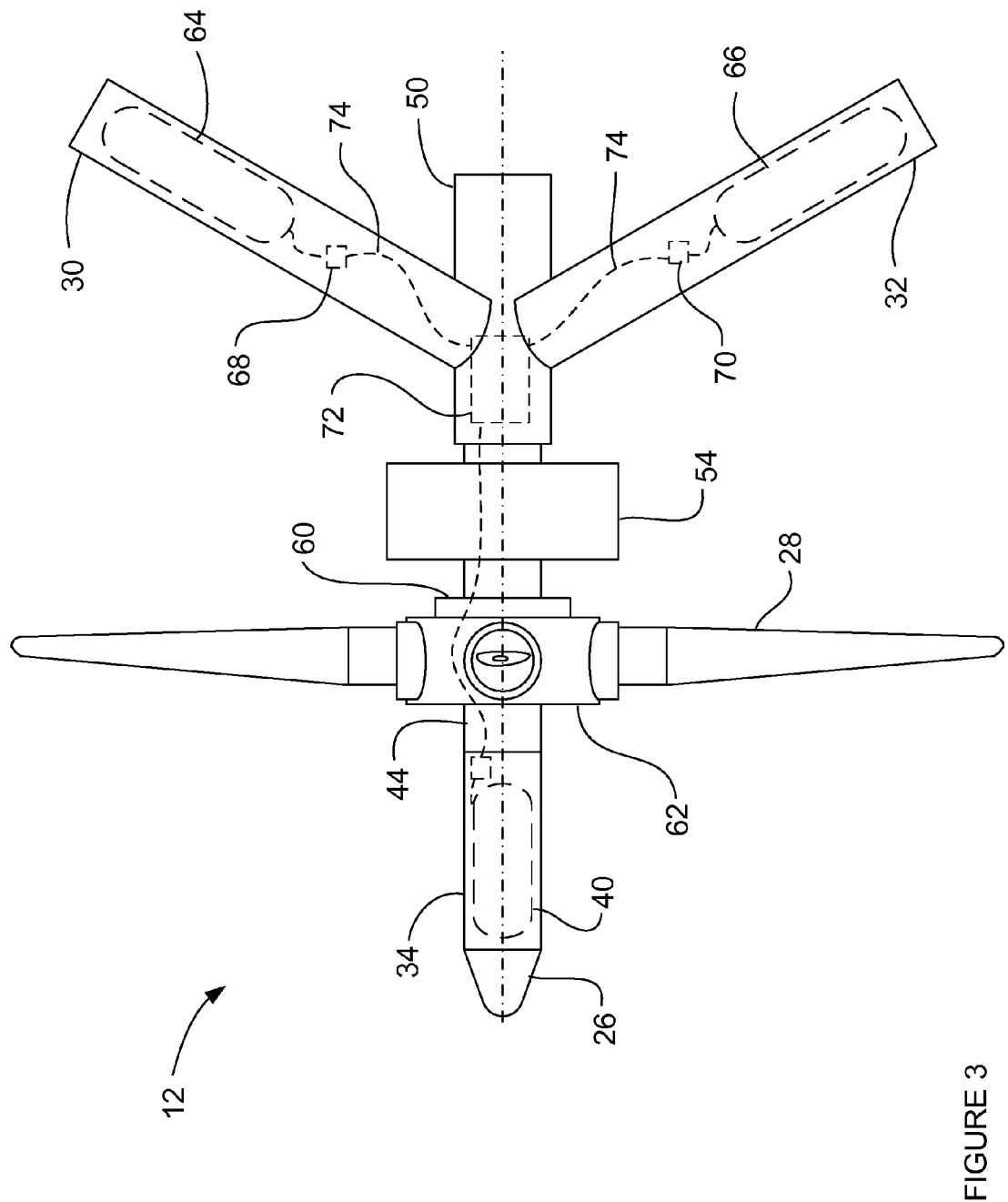
FIG. 3 is an illustration in top view of the flowing water turbine system illustrated in FIG. 1.

In the preferred embodiment, the second and third body portions 30, 32 mount to the enclosure 50 as shown in FIG. 3. The body portions 30, 32 extend at an angle from the enclosure 50 and are sized in length to provide the necessary stability needed for operation and buoyancy. In the preferred embodiment, the included angle between the second body portion 30 and third body portion 32 is approximately 120 degrees. However, it is contemplated that smaller angles could be utilized if the length of body portions 30, 32 are extended to provide the desired stability and control. Each of the body portions 30, 32 include a water fillable tank 64, 66 (e.g. ballast tanks) respectively. The tanks 64, 66 are substantially similar or identical to tank 40, however different size tanks may be used depending on the needs of the application. Similar to tank 40, each tank 64, 66 will have an associated pump 68, 70 to allow filling and ejecting of water from the tanks 64, 66. Additionally, it should be appreciated that while the tanks 40, 64, 66 are illustrated as a single tank, it may be desirable to utilize multiple tanks in each body portion 24, 30, 32 to allow for greater control or stability.

In the preferred embodiment, the water turbine body portions 24, 30, 32 are generally cylindrical in shape to facilitate and reduce the costs of fabrication. The use of a generally cylindrical body also advantageous in that it provides a shape that is conducive to being towed to position without the use of additional or supplementary floatation devices. It should be appreciated that the water turbine body portions 24, 30, 32 may also be any suitable shape that provides the necessary structural integrity to support the turbine during operation and allows the water turbine 12 to be towed without additional floatation equipment.

A controller 72 is mounted in the enclosure 50 to provide control functionality to the water turbine 12. The controller 72 coupled to receive signals and data via communications cable 38 (FIG. 2) from a controller 17 (FIG. 1) on the floatation device 16. The controller 72 provides necessary control functionality needed to operate the water turbine 12. In the preferred embodiment, each of the pumps 42, 68, 70 are operably coupled to receive signals from the controller 72. The controller 72 may selectively operate the pumps 42, 68, 70 to fill or eject water from the tanks 40, 64, 66. By adjusting the amount of water (e.g. ballast) in the tanks 50, 64, 66 the controller may adjust the depth of operation, control the attitude of the water turbine 12 and compensate for the torque generated by the rotation of the blades 28.

Controller 72 is a suitable electronic device capable of accepting data and instructions, executing the instructions to process the data, and presenting the results. Controller 72 may accept instructions through communications cable 38 or through other means such as but not limited to a user interface, electronic data card, voice activation means, manually-operable selection and control means, radiated wavelength and electronic or electrical transfer. Therefore, controller 72 can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a scientific computer, a scientific calculator, or a hybrid of any of the foregoing.

Controller 72 is operably coupled with one or more components of water turbine 72 by data transmission media 74. Data transmission media 54 includes, but is not limited to, twisted pair wiring, coaxial cable, and fiber optic cable. Data transmission media 74 also includes, but is not limited to, wireless, radio and infrared signal transmission systems. In the embodiment shown in FIG. 3, transmission media 74 couples controller 72 to pumps 42, 68, 70 as well as other optional components (not shown) such as sensors or gyroscopes. Controller 72 is configured to provide operating signals to these components and to receive data from these components via data transmission media 74.

Figure 4:
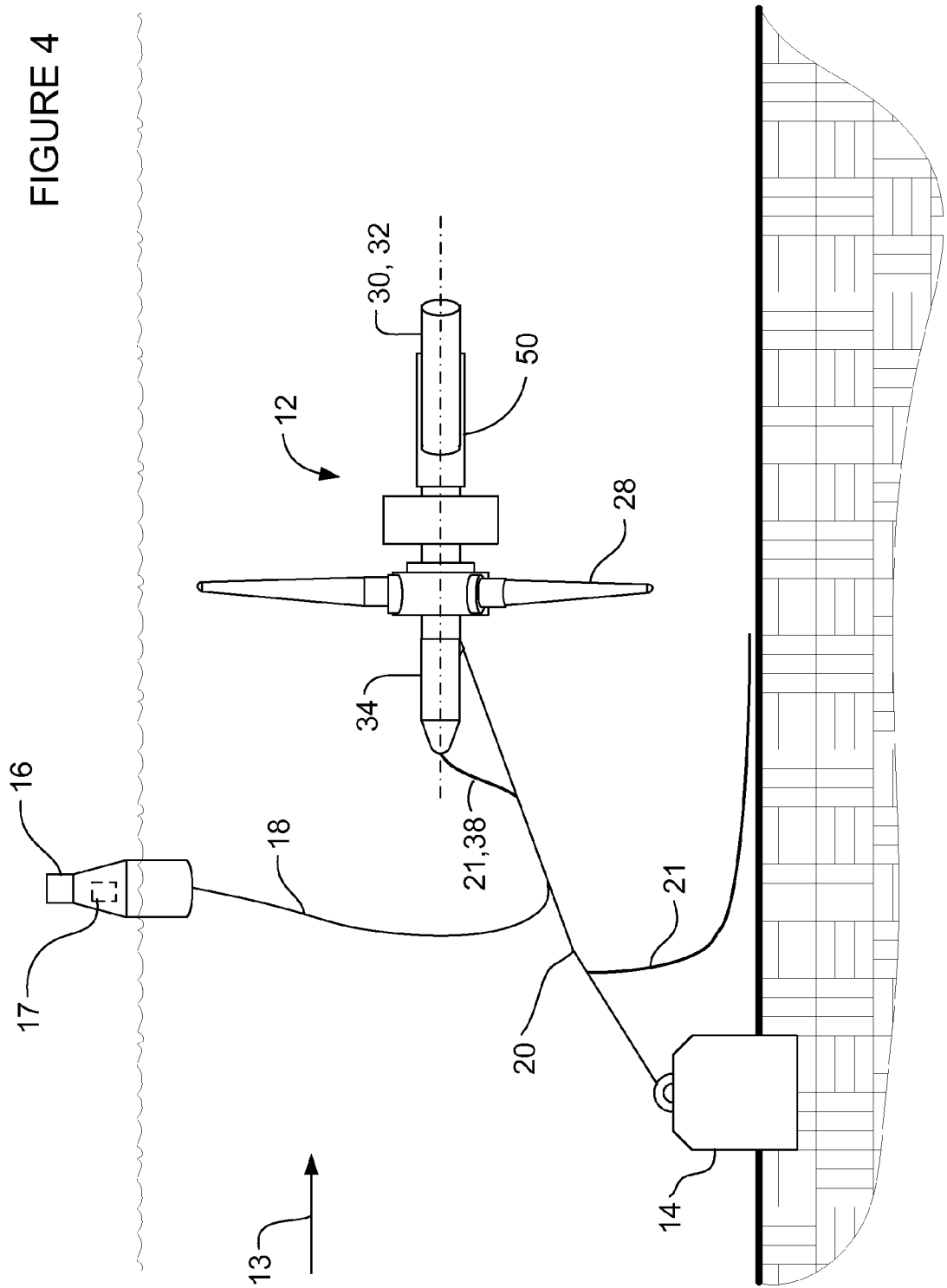
FIG. 4 is an illustration in side view of the flowing water turbine system of Figure in its operating position.

In operation, the controller 72 adjusts the depth of operation on the water turbine 12 to achieve the desired operating parameters. The water turbine system 10 is shown in its operating position in FIG. 4. Preferably, the water turbine system will be oriented such that the blades 28 will rotate in a plane perpendicular to the direction of the water current 13. The depth of operation may be determined through any conventional means, such as sensors on the water turbine 12, sensors coupled to the controller 17 or through use of historical data. If an operator needs to issue a command, they may do so through a user interface on controller 17. The controller 17 user interface may accept instructions through means such as but not limited to a user interface, electronic data card, voice activation means, manually-operable selection and control means, radiated wavelength and electronic or electrical transfer.

Signals from the controller 17 are transmitted via cable 18 which connects to mooring cable 20. In the preferred embodiment, the cable 18 includes two components, a structural cable that couples the floating device 16 to the mooring 14, and a data communication cable. Similarly, the power cable 21 is coupled to the mooring cable 20 to route the power cable 21 from the sea bed floor to the water turbine 12. Typical marine power cables include an electrical power conductor and a data communications cable 38 such as a fiber optic cable. A protective steel and plastic sheath will typically surround the power and data cables. The steel sheath physically protects the mooring cable 38 from mechanical damage while the plastic sheath acts to prevent corrosion and biofouling. The mooring cable 20 provides the necessary structure to couple all of the system 10 components to facilitate installation, removal and servicing of the water turbine 12.

Once at the desired operating depth, the blades 28 will rotate under the influence of the moving water to rotate the generator 22 to create AC electrical power. The electrical power is transmitted via power cable 21 out through the nosecone 26 along the mooring cable 20 and ultimately along the sea bed floor until the electrical power is delivered to its final destination. It may be necessary, due to changing current 13 and operating environments for the controller 72 to selectively adjust the amount of water in each of the tanks 40, 64, 66 to maintain the water turbine 12 in the correct trim or attitude relative to the water current 13. Typically this will be accomplished by injecting or ejecting water from one of the tanks 40, 64, 66 while keeping the remaining tanks at the same state.

Figure 5:
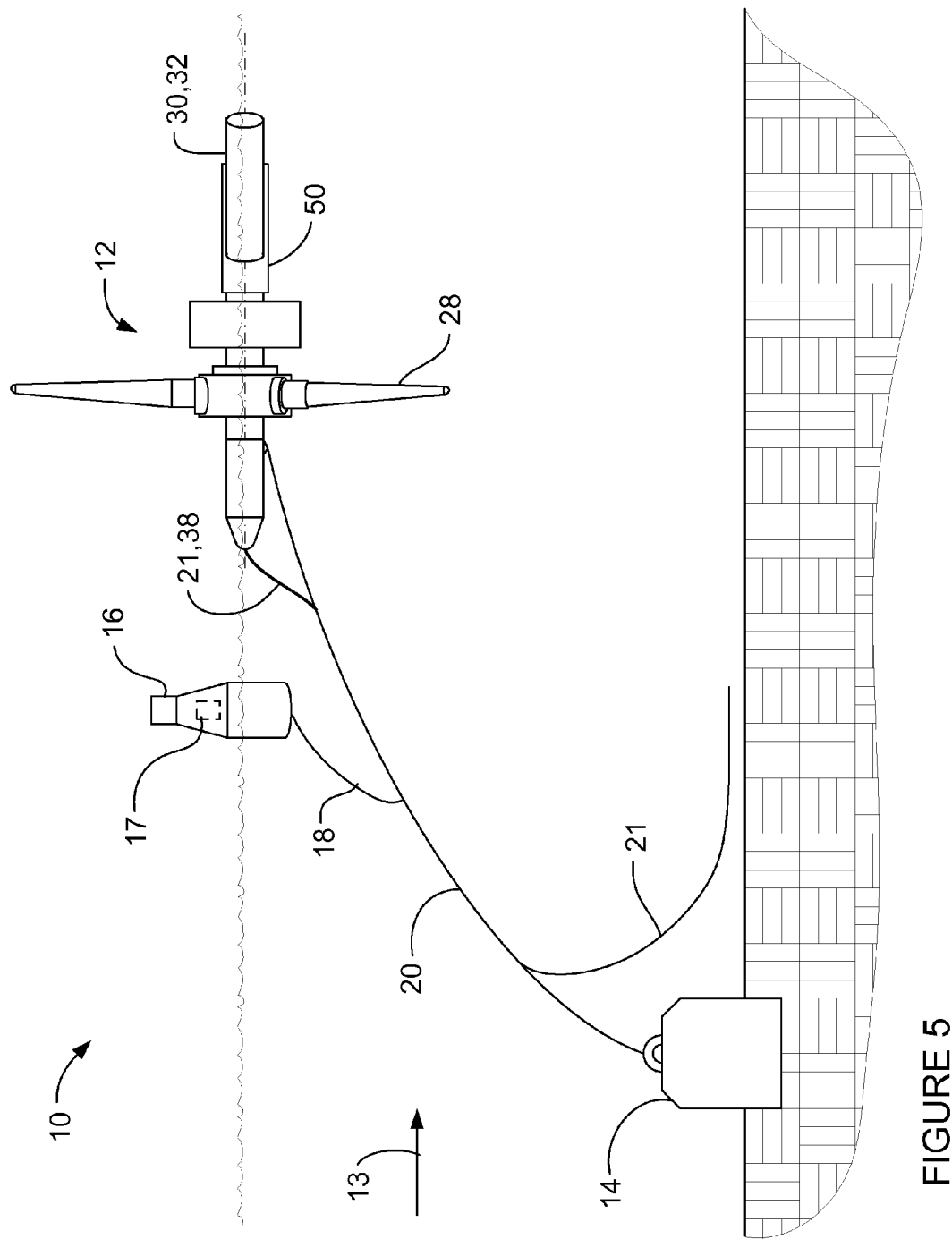
FIG. 5 is an illustration in side view of the flowing water turbine system of FIG. 1 in the process of being deployed or recalled from operation.
Figure 6:
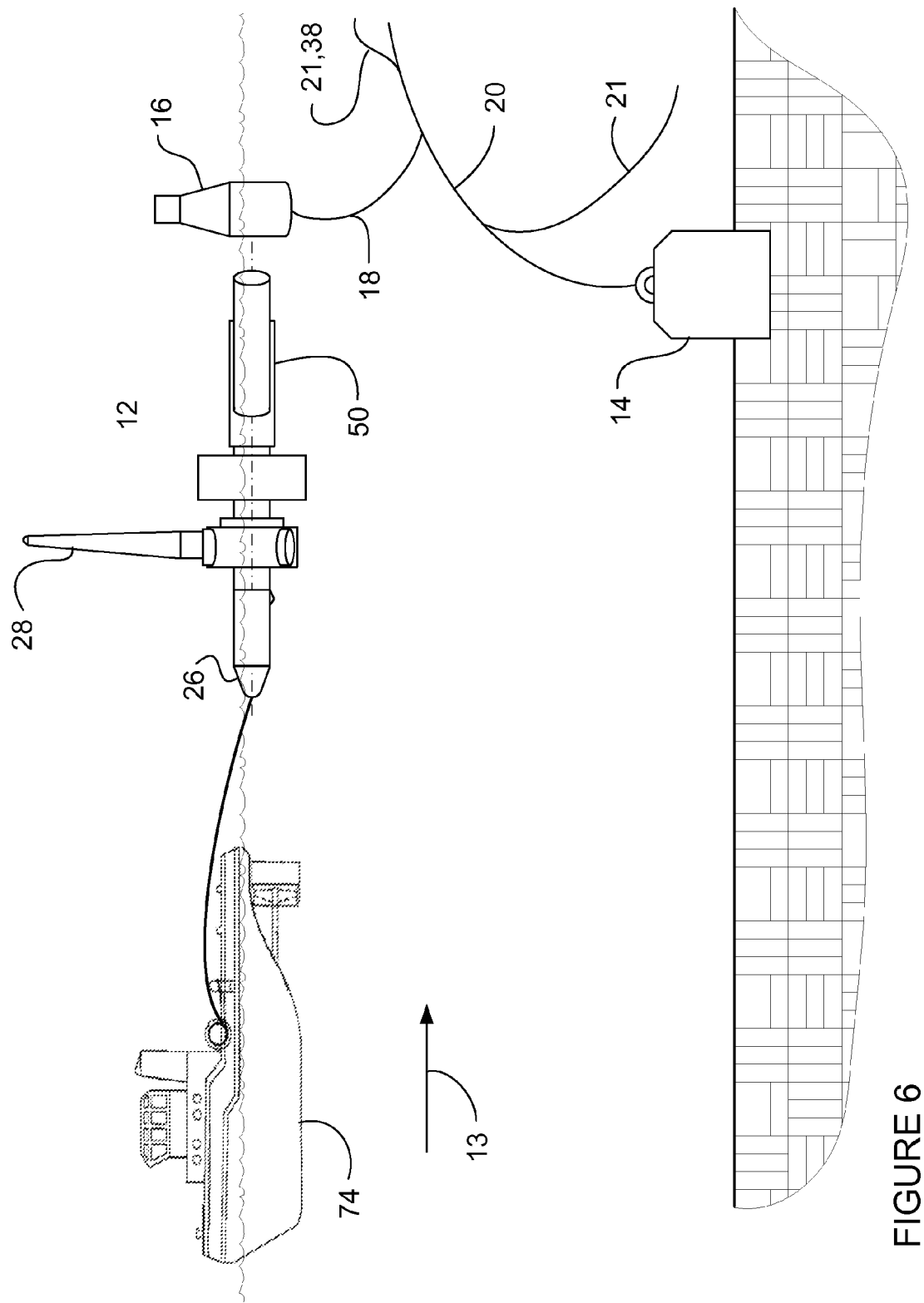
FIG. 6 is illustration in side view of the flowing water turbine system of FIG. 1 in a position for relocation or servicing.

Referring to FIG. 5 and FIG. 3, the system 10 is illustrated and described in a non-operation service, installation or removal positions. In the case where the operator desires to retrieve the water turbine 12 from operation when the water turbine 12 is submerged, a signal is transmitted from the controller 17 to controller 72 via cable 38. Upon receiving the signal, controller 72 transmits a signal to pumps 42, 68, 70 to eject water from the tanks 40, 64, 66. The ejection of the water increases the buoyancy of the water turbine 12 causing the water turbine to rise to the surface. Once on the surface, the water turbine 12 may be serviced, or if necessary decoupled from the system 10 and towed by a ship 74 to either another location or to a repair facility as shown in FIG. 6. In the preferred embodiment when the water turbine 12 is being deployed or removed from service, one of the blades 28 will be removed and the hub 62, blade 28 assembly rotated such that no blades remain beneath the water. By removing the bottom blade the drag on the ship 74 will be reduced allowing for faster transit. Alternatively, the blade 28 may be left on and the water turbine 12 may be towed at a slower speed.

It should be appreciated that the deployment of the water turbine 12 will be the opposite of that described in the preceding paragraph. After coupling the water turbine 12 to the mooring cable 20, the power cable 21 and the communications cable 38, the blade 28 is reattached and a signal is transmitted from the controller 17 to the controller 72. In response to the signal, the controller 72 fills the tanks 40, 64, 66 reducing the buoyancy of the water turbine 12 causing it to sink. Once the desired depth is achieved, the controller 72 ejects a portion of the water from the tanks 40, 64, 66 until neutral buoyancy is achieved.

Figure 7:
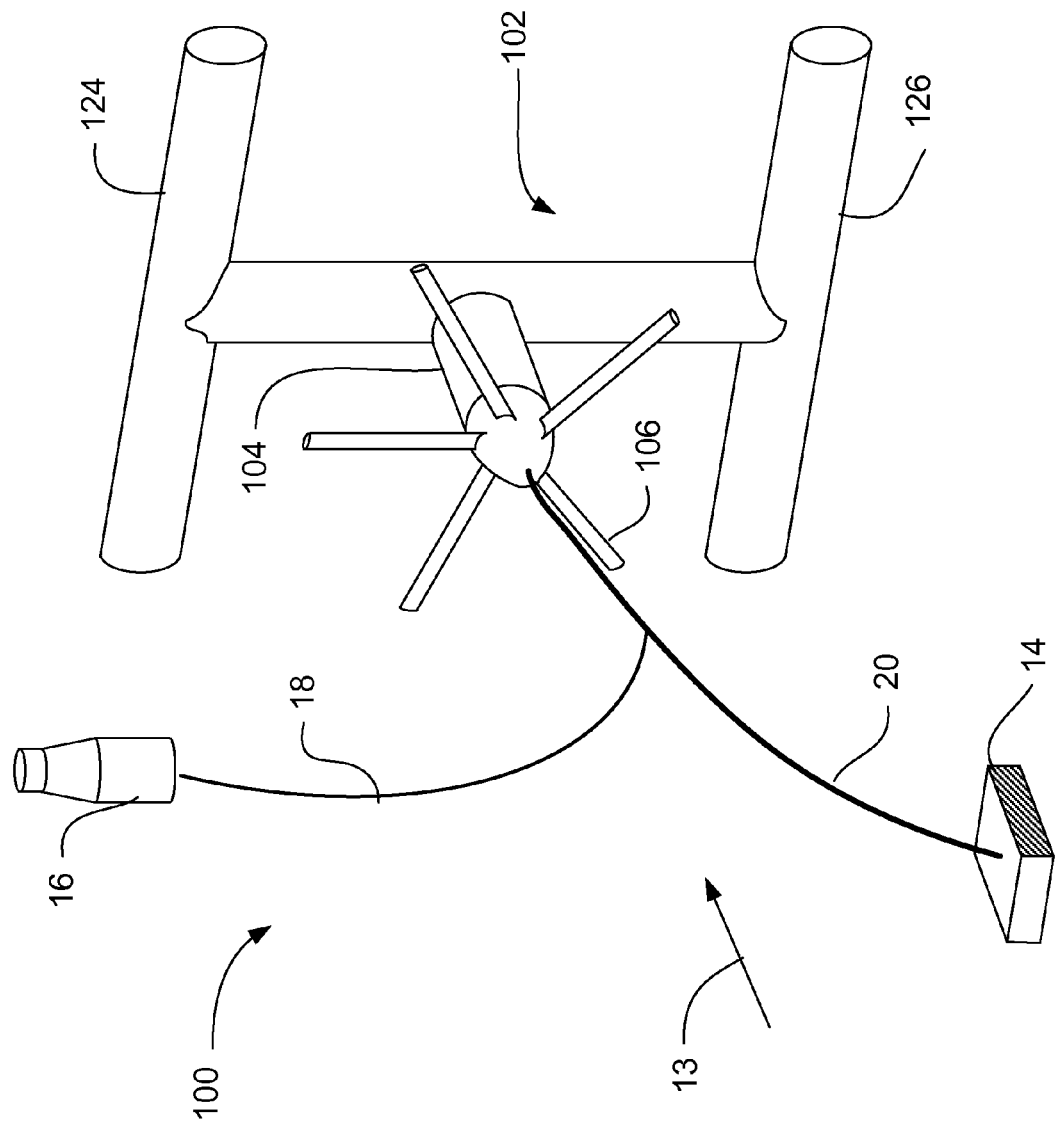
FIG. 7 is an illustration in perspective view of an alternate embodiment flowing water turbine power system.
Figure 8:
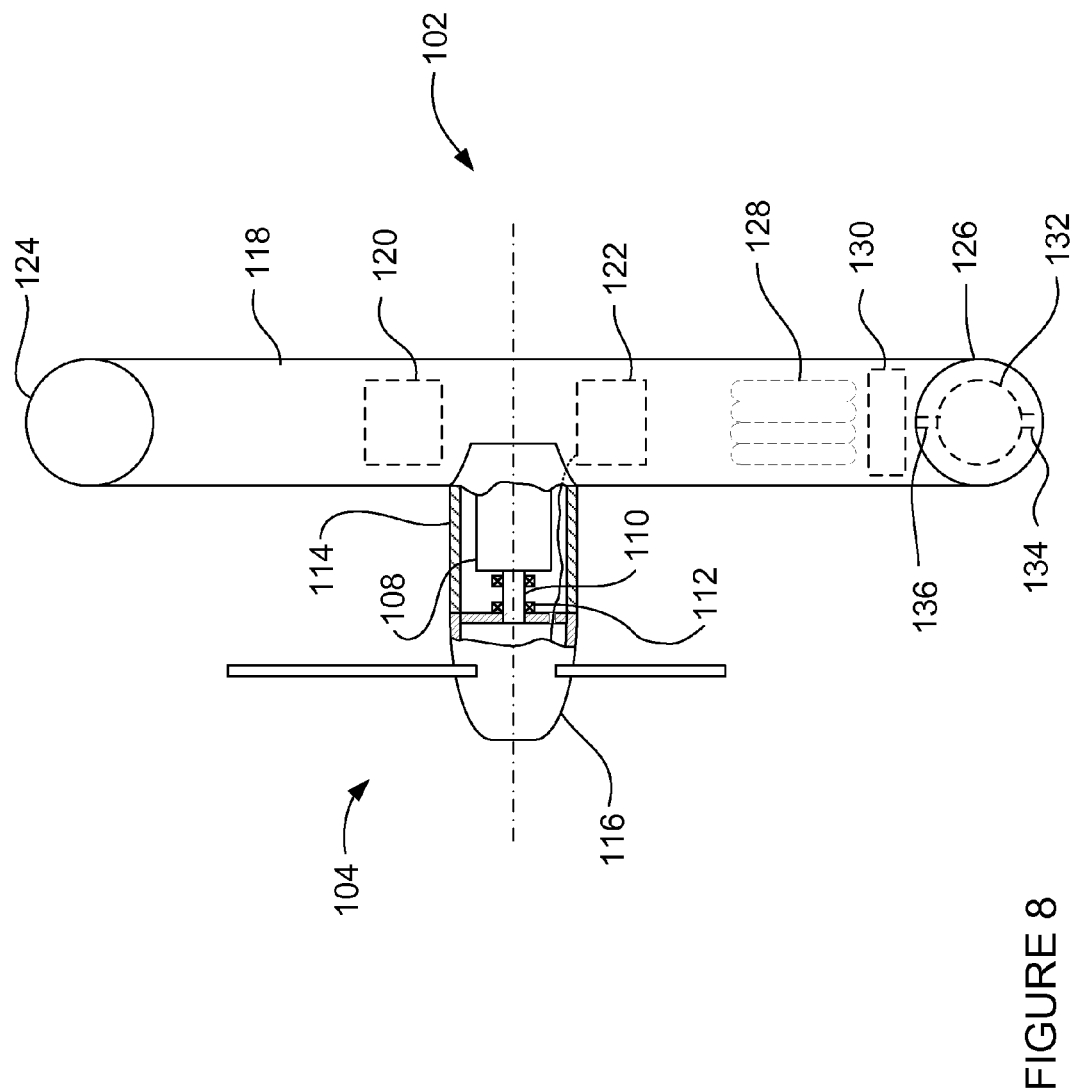
FIG. 8 is an illustration in side view of the alternate embodiment flowing water turbine system illustrated in FIG. 7; and, FIG. 9 is an illustration in front view of another alternate embodiment flowing water turbine.

An alternate embodiment flowing water turbine system 100 is shown in FIG. 7 and FIG. 8. In this embodiment, the turbine structure 102 has a generator portion 104 that includes a plurality of turbine blades 106. The blades 106 are coupled to an electrical generator 108 through a shaft 110 which is supported by one or more bearings 112. The generator portion 104 includes a housing 114 and a nose cone 116. The housing 114 surrounds the electrical generator 108 and provides a waterproof enclosure that protects the electrical generator 108 from the sea water environment. The nose cone 116 is coupled to the housing 114 and may include a variety of pass-through conduits and devices such as slip-rings (not shown) that allow control and power cables 20 to allow the connection of the stationary mooring 14 and flotation device 16 through the rotating nose cone 116. It should be appreciated that alternatively, the first body portion and generator arrangement described in reference to the preferred embodiments where the generator rotates around the nosecone and stationary housing would be interchangeable with the generator portion 104 shown in FIG. 7 and FIG. 8.

The generator portion 104 connects to a vertical body portion 118. In this embodiment, the turbine system 100 controls 120 and power electronics 122 are mounted within the body 118. The body 118 may be cylindrical, as illustrated or any convenient desired shape. The body 118 connects the generator portion 104 to the upper and lower portions 124, 126 respectively. The body 118 may also contain compressed air cylinders 128 and the associate control hardware 130 necessary to control the buoyancy and depth of the turbine system 100. In this embodiment, the turbine structure 102 is arranged for the body 118 and the lower 124 and upper 126 portions to form an "I" arrangement. As will be described in more detail herein, this arrangement is desired to provide stability during deployment and retrieval from the operating location.

The lower portion 126 includes a fillable chamber or tank 132. The tank 132 includes one or more conduits 134 that allow water to enter. The tank 132 also includes one or more conduits 136 that allow air to escape/vent. It should be appreciated that the locations and numbers of conduits 134, 136 illustrated in FIG. 8 are for exemplary purposes and the number or location of such conduits may be changed to suit the needs of a given turbine system 100 without departing from the spirit of the present invention. The conduits 134, 136 also include flow control hardware (not shown) such as valves to control either the intake, or removal of water from the tank 132. Alternatively, instead of using compressed air, the system 100 may incorporate bladder tanks and pumps as described in reference to the preferred embodiment discussed above.

The tank 134 is operably connected to the compressed air cylinders 128 through conduits (not shown). The conduits are arranged to allow air to flow from the compressed air cylinders 128 to the tank 132 to allow removal of water. It should be appreciated that while the tank 132 is shown as a single chamber, it may alternatively be comprised of a plurality of chambers that may be selectively filled with water to aid in the adjustment of buoyancy. It is also contemplated that additional chambers may be distributed within the body 118 or upper portion 124.

Another alternate flowing water turbine system 200 is shown in FIG. 9. In this embodiment, the generator portion 202 is connected to a vertical 204 and lateral 206 bodies. The vertical body 204 and lateral body 206 are arranged as being generally perpendicular to one another. In this exemplary embodiment, the vertical body 204 and lateral body 206 are illustrated as being roughly equal in length. However, it is contemplated that the vertical member 204 may be longer, to provide additional stability and buoyancy control.

The vertical body 204 is comprised of an upper half 208 and a lower half 210. To aid in the stability and maintaining orientation, the lower half 210 includes a fillable tank 212. The tank 212 is operably coupled to a compressed air cylinder 214 and a plurality of conduits (not shown). Alternatively, the air cylinders 214 and tank 212 maybe replaced by a bladder tank and pump as described in reference to the preferred embodiment. Optional additional tanks 216 may be located within the lateral body 206. Similar to that described above with reference to tank 212, the tanks 216 may be unitary as illustrated, or may be comprised of a plurality of chambers each of which may be individually filled or vacated to adjust the buoyancy of the water turbine 200.

While the invention has been described with reference to a preferred embodiment, it will be understood by those skilled in the art that various changes may be made and equivalent structures or devices may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A flowing water turbine system comprising:
    a submerged mooring;
    a buoy coupled to said mooring, said buoy having a controller;
    a flowing water turbine coupled to said mooring, said water turbine having:
        a first body portion having a first and second end and an electrical generator mounted between said first and second end;
        a second body portion mounted to said first body portion between said electrical generator and said second end;
        a third body portion mounted to said first body portion adjacent said second body portion; and,
        at least one water fillable tank in each of said first, second and third body portions; and,
    a turbine controller mounted in said water turbine and operably coupled to said buoy controller and each of said water fillable tanks.

2. The flowing water turbine system of claim 1 wherein said buoy controller includes a user activation device and a means for transmitting a signal to said turbine controller.

3. The flowing water turbine system of claim 2 wherein said turbine controller includes means for selectively filling and ejecting water each of said water fillable tanks.

4. The flowing water turbine system of claim 3 further comprising a plurality of pumps, each of said plurality of pumps being associated with a water fillable tank and arranged to fill and eject water from said water fillable tanks in response to a signal from said turbine controller.

5. The flowing water turbine system of claim 2 wherein said user input device is selected from the group consisting of an electronic data card, voice activation means, manually-operable selection and control means, radiated wavelength and electronic or electrical transfer.

* * * * *